Feb. 1, 1927.

G. FAST 1,616,034

FLEXIBLE SHAFT COUPLING

Filed March 17, 1925    2 Sheets-Sheet 1

Inventor:

Gustave Fast,
by Spear, Middleton, Donaldson & Hall
Attys.

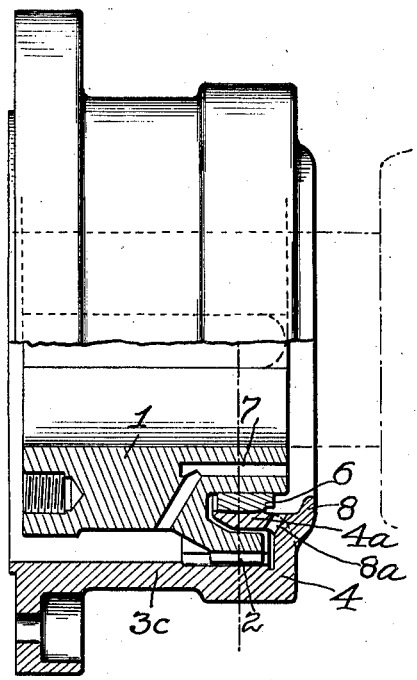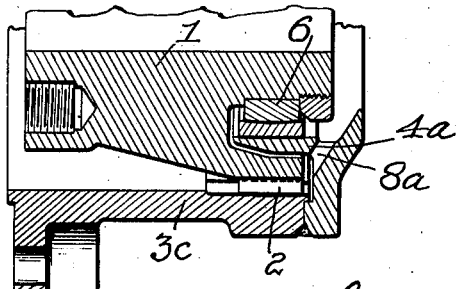

Patented Feb. 1, 1927.

1,616,034

UNITED STATES PATENT OFFICE.

GUSTAVE FAST, OF ANNAPOLIS, MARYLAND.

FLEXIBLE SHAFT COUPLING.

Application filed March 17, 1925. Serial No. 16,192.

My invention relates to the type of flexible shaft coupling disclosed in Letters Patent of the United States granted to me, Reissue No. 15,177, August 16, 1921, and concerns the features and combination and arrangement of parts hereinafter described and particularly pointed out in the claims.

In the accompanying drawings—

Fig. 3 is a detail sectional view of a part of a coupling with means for insuring proper lubrication of the load-bearing surfaces.

Fig. 4 is a view of a modified form of bearing.

Figure 1:
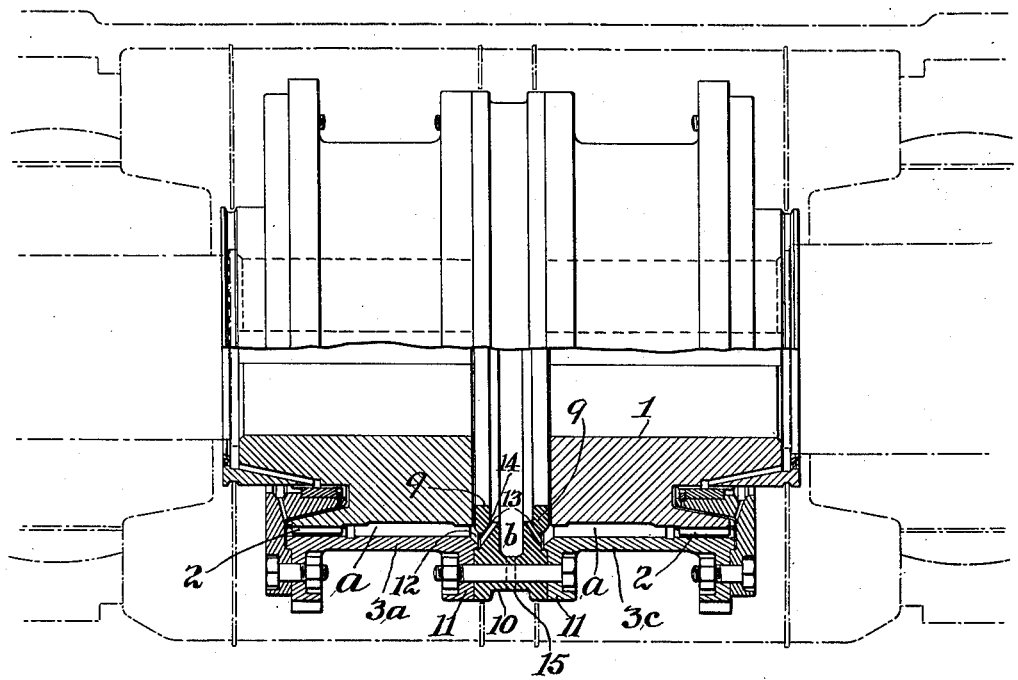
Figure 1 is a central vertical sectional view of the coupling embodying the invention.

In these drawings, 1 indicates shaft hubs which are keyed to the shaft ends which are to be coupled, 2 indicates annular rows of teeth between the shaft hubs and a sleeve member 3ª, 3ᶜ, through which motion is imparted from the driving to the driven shaft. These teeth may be of the general form and arrangement shown in the said patent. A rocking bearing is provided between the sleeve and the shaft end, and while this may assume different forms, I show in the present form of the invention a form of rocking bearing within the circle of teeth. This may consist of a ring 6 Fig. 3, having its outer spherical surface curved to conform to a section of a sphere whose center is at the axis of the coupling and in a plane transverse to and intermediate of the length of the intermeshing teeth. This spherical bearing may bear on a cylindrical surface on the inner side of the flange 4ª of the end plate or ring 4 of the sleeve, or the inner periphery of this flange may be of the same curved spherical form as the exterior of the ring, or a ring may be interposed between the ring 6 and the flange 4ª, as in Fig. 4.

I have provided means to insure proper lubrication of the parts. The object of lubrication is, of course, to prevent wear on the load-carrying surfaces. If the quantity of lubricant within the coupling is sufficient to submerge the teeth or load-carrying surfaces, when the coupling is running, the centrifugal force to which the lubricant is subjected will impel the oil between the load-bearing surfaces and maintain a film at this point which will keep these surfaces out of metallic contact and no wear will occur. The lubricant can be introduced into the casing in the form of a charge, as in my patent above referred to. In the present case, I locate the filling opening at a point nearer the axial center of the coupling than any of the load-bearing surfaces. This is shown in Fig. 3 in which I show a filling port 7 extending through the shaft hub at a point within the rocking bearing and connecting at its inner end with the interior of the sleeve. The end plate of the sleeve has a lip 8 which reaches radially inward closer to the axial center of the coupling than the bearing and, of course, closer than the intermeshing teeth to said axial center, but this lip does not reach in to the level of the filling port 7. This lip forms a centrifugal oil collector. The space bounded by this lip is connected by ports 8ª with the space within the sleeve. The oil, when the coupling is at rest, is filled approximately to the level of this lip.

The provision for introducing, directing and retaining the oil in the arrangement above described, is suitable for couplings known as exposed couplings, which have no surrounding casing and they meet the requirements of a large proportion of the situations in which the use of a flexible shaft coupling is demanded.

There is another general class of coupling known as enclosed couplings used mainly in connection with steam turbines, where oil circulation through the coupling is necessary, this being derived from the force feed system of the connected machines.

In such circulating systems trouble has been experienced because of the collection of dirt within the coupling due to the fact that centrifugal force resulting from the revolution of the coupling with its contained oil, gives the effect of a centrifugal separator, the heavy material such as dirt accumulating against the wall of the sleeve and getting in between the teeth which, therefore, wear rapidly. If oil discharge holes are formed through the casing leading directly from the space in which the intermeshing teeth are located, the discharge of oil due to centrifugal force might readily be greater in amount than that supplied to the coupling by the force feed system, in which event the load-carrying surface within the coupling would not be totally submerged in lubricant and hence undue wear of these surfaces would ensue.

If a pipe be provided reaching in from the wall of the sleeve and arranged to receive lubricant at its open inner end and discharge through said wall, the effect would be undesirable because the pipe would act as a skimmer and thereby cause the discharge of the lighter clear portions of the lubricant while the heavier portions, water and sediment, would be trapped within the casing and if permitted to accumulate over a considerable period of time, it would fill the coupling and prevent the bearing surfaces from receiving the necessary degree of lubrication.

To avoid these objections and insure the presence of clean lubricant at the load-bearing surfaces, and the discharge of any dirt or foreign matter that may enter the coupling with the circulating oil, I provide dams 9 extending inwardly from the sleeve to a point somewhat closer to the axial center of the coupling than the radial distance of the intermeshing teeth from said axial center. These dams or walls extend in between the meeting ends of the shaft hubs and they may be provided by forming them upon a ring 10 bolted between the flanges 11 of the sections $3^a$, $3^c$ of the sleeve. These dams or walls are provided with drain ports 13 leading from the spaces $a$ in which the intermeshing teeth are located, said ports being in communication with said spaces through the annular grooves 12, the bottoms of which are of larger diameter than the diameter of the inner wall of the sleeve so that these grooves act as temporary collecting spaces for the heavier portions of the oil, sediment, water, etc. The ports 13 lead from these grooves 12 to the space $b$ between the dams or walls 9, and their discharge ends lie at the shoulders 14 of said walls or dams, and all of these discharge ends are at the same radial distance from the axial center of the coupling.

The final discharge openings leading from the coupling for the escape of oil, lead from the space $b$, one of these discharge openings being indicated in dotted lines at 15. It will now be seen that centrifugal force will drive the dirt, heavy portions of lubricant and foreign matter into the collecting grooves 12 and as the accumulation of foreign matter at this point persists it will pass through the ports 13 to the space $b$ and thence out through the ports 15 and away from the coupling, it being caught by any suitable means, such as a collecting casing surrounding the coupling.

The drain ports 13 are arranged radially, or nearly so, the flow through them taking place inwardly, because the dam has a smaller radius than the radius of the outlet ends of the drain openings, and it is, therefore, possible to build up a centrifugal head, within the space of which the dam forms the end wall, by the lighter oil within the sleeve, which will cause the forcing out of the heavy matter and foreign substances.

This centrifugal head, created by the revolution of the coupling, overcomes the difference in specific gravity of the different materials included in the body of the lubricant, and, therefore, the discharge of the heavy materials takes place from space $a$ and groove 12 in a substantially radially inward direction through the ports 13 to the space $b$, and thence outwardly through ports 15.

It is important that the inlet and outlet of each drain hole 13 be respectively at the same radial distance from the axial center of the coupling as the inlets and outlets of all the other drain holes around the coupling, otherwise there would take place a greater discharge of oil at some points around the circle of ports than at other points, resulting in an unbalanced condition of the coupling. Especially is this so of the outlet ends of the said ports 13, the discharge of oil taking place through those located at the greater radial distance from the center of the coupling at a more rapid rate than at those nearer the axial center.

Figure 2:
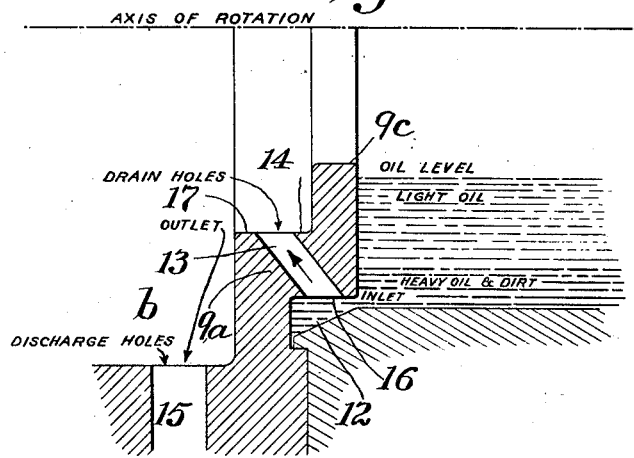
Fig. 2 is a sectional view in the nature of a diagram illustrating features relating to the lubricating system.

In order that the inlet and outlet of each drain port 13 shall be at exactly the same radial distance, respectively, with all the other inlets and outlets, I form cylindrical surfaces 16 and 17, as shown in Fig. 2, on the shoulder or offset portion $9^a$ of the dam or guard $9^c$, and the ports 13 have their inlets and outlets at these cylindrical surfaces and the rate of discharge through all these ports 13 will, therefore, be uniform. A slight variation in the drilling of these ports will not affect the uniformity of the rate of discharge so long as the inlet and outlet openings lie respectively at said cylindrical surfaces.

The course of the discharge of the heavy oil and dirt under the force of the centrifugal head produced by the body of light oil, is indicated by the arrows in Fig. 2.

Either one of the rocking bearings may be used in Fig. 1, in place of the bearing there shown.

I claim:—

1. A flexible shaft coupling comprising a sleeve having teeth to engage teeth on the shaft end for imparting motion from one member to the other, said sleeve having a dam or guard defining a space to be occupied by a body of oil for submerging the intermeshing teeth, and for creating a centrifugal head of said oil, said dam having inwardly directed discharge ports for the discharge of foreign matter and heavier portions of said oil under said centrifugal head, from the portion of said space most distant from the axial center of the coupling, said sleeve having a rocking bearing with the shaft end, substantially as described.

2. A flexible shaft coupling comprising a sleeve having teeth to engage teeth on the shaft end for imparting motion from one member to the other, said sleeve having a dam or guard defining a space to be occupied by a body of oil for submerging the intermeshing teeth, and for creating a centrifugal head of said oil, said dam having inwardly directed discharge ports for the discharge of foreign matter and heavier portions of said oil under said centrifugal head, from the portion of said space most distant from the axial center of the coupling, said sleeve having a circumferential groove at the base of the guard or dam of larger diameter than the interior of the sleeve, and communicating with said interior and with the discharge ports of the dam, substantially as described.

3. A flexible shaft coupling having shaft hubs, a sleeve, intermeshing teeth between the hubs and sleeve, a rocking bearing between the sleeve and shaft hubs in a plane transverse to and intermediate the length of the intermeshing teeth, said sleeve having end walls to insure a depth of oil in the sleeve when at rest sufficient to submerge the load-bearing surfaces, and an inlet port for the introduction of oil to said bearing, said port extending through the shaft hub at a point nearer the axial center of the coupling than the rocking bearing and the intermeshing teeth, substantially as described.

4. A flexible shaft coupling comprising a sleeve having teeth to mesh with teeth on the shaft end, and having end walls to retain oil within the sleeve for lubricating the teeth, said sleeve having also an annular guard or dam projecting inwardly from its wall, with discharge openings directed therethrough and at a greater distance radially from the axial center of the coupling than the inner edge of said dam or guard, said discharge openings having their inlet ends at a greater radial distance from the axial center than their discharge ends, and connecting the space within which the intermeshing teeth are located with the oil discharge space within the sleeve on the opposite side of the guard or dam from the space first mentioned, said coupling having openings through the sleeve for the discharge of the oil from said discharge space.

5. A flexible shaft coupling comprising a sleeve having teeth to engage teeth on the shaft end for imparting motion from one member to the other, said sleeve having a dam or guard defining a space to be occupied by a body of oil for submerging the intermeshing teeth, and for creating a centrifugal head of said oil, said dam having inwardly directed discharge ports for the discharge of foreign matter and heavier portions of said oil under said centrifugal head, from the portion of said space most distant from the axial center of the coupling, said dam having a cylindrical surface coaxial with the sleeve and at which the outlets of the said discharge ports lie.

6. A flexible shaft coupling comprising a sleeve having teeth to engage teeth on the shaft end for imparting motion from one member to the other, said sleeve having a dam or guard defining a space to be occupied by a body of oil for submerging the intermeshing teeth, and for creating a centrifugal head of said oil, said dam having inwardly directed discharge ports for the discharge of foreign matter and heavier portions of said oil under said centrifugal head, from the portion of said space most distant from the axial center of the coupling, said dam or guard having concentric cylindrical surfaces coaxial with the sleeve and at which the inlet and outlet openings of the discharge ports lie, substantially as described.

7. A flexible shaft coupling comprising a sleeve with internal teeth at its ends to mesh with teeth on the shaft ends, and having a pair of annular dams or guards spaced apart projecting inwardly from the sleeve and defining spaces to be occupied by oil for submerging the teeth, and for creating a centrifugal head of said oil, said dams having inwardly directed ports for discharge of foreign matter and heavier portions of the oil from the zone in which the intermeshing teeth lie, said sleeve having discharge openings leading outwardly from the space between the dams, substantially as described.

8. A flexible shaft coupling comprising a sleeve having internal teeth at its ends to mesh with teeth on the shaft ends, said sleeve being made up of end sections and an intermediate section secured together, annular guards or dams on the intermediate section spaced apart and projecting inwardly from said section and defining spaces to be occupied by oil for submerging the teeth and for creating a centrifugal head of oil in each space, said dams having inwardly directed ports leading from the outer zones of the oil spaces to discharge heavy matter therefrom, said ports discharging into the space between the dams, said sleeve having discharge ports leading from the last mentioned space, substantially as described.

9. A flexible shaft coupling comprising a sleeve having teeth to engage teeth on the shaft end for imparting motion from one member to the other, said sleeve having a dam or guard defining a space to be occupied by a body of oil for submerging the intermeshing teeth, and for creating a centrifugal head of said oil, said dam having inwardly directed discharge ports for the discharge of foreign matter and heavier portions of said oil under said centrifugal head, from the portion of said space most distant from the axial center of the coupling.

10. In a coupling, the combination of a sleeve having internally disposed teeth, teeth on a shaft member to engage the same, said sleeve and shaft member being spaced apart to form a lubricant receiving chamber, said chamber having a sediment collecting space extending outwardly therefrom and at a distance more remote from the axis of the coupling than the chamber, and a series of discharge ports extending toward the axis and communicating with said space.

In testimony whereof, I affix my signature.

GUSTAVE FAST.